United States Patent Office 3,409,418
Patented Nov. 5, 1968

3,409,418
DENSE PRODUCTS OF VANADIUM OR ZIRCONIUM NITRIDE WITH IRON, NICKEL OR COBALT
Paul C. Yates, Wilmington, Del., assignor to E. I. du Pont de Nemours and Company, Wilmington, Del., a corporation of Delaware
No Drawing. Continuation-in-part of application Ser. No. 457,468, May 20, 1965. This application Nov. 9, 1966, Ser. No. 593,000
6 Claims. (Cl. 29—182.5)

ABSTRACT OF THE DISCLOSURE

Dense, refractory compositions of vanadium or zirconium nitride, bonded with iron cobalt or nickel are useful as cutting tool tips.

CROSS-REFERENCE TO RELATED APPLICATIONS

This application is a continuation-in-part of my copending application Ser. No. 457,468, filed May 20, 1965, now abandoned which in turn is a continuation-in-part of my copending application Ser. No. 371,778, filed June 1, 1964, now abandoned.

This invention relates to refractory compositions and is more particularly directed to vanadium nitride, zirconium nitride, hafnium nitride, niobium nitride or a mixture of them interdispersed with iron, cobalt, nickel, and their alloys. The invention is further directed to the preparation of these interdispersions, to their use as high temperature refractories and cutting tools, and to the preparation of the nitrides utilized in the interdispersions.

The refractory interdispersions of this invention are exceptionally hard and strong, and display outstanding resistance to chemicals, thermal shock, impact, and high temperatures. Accordingly, they an be used in the numerous ways in which refractory materials are conventionally used. Further, in the form of tool bits and cutting tools, these interdispersions display great resistance to wear, great resistance to cratering and are resistant to welding to work pieces being cut even at high speeds.

The term "interdispersion" as used herein describes a relationship of the constituents and is meant to include traditional dispersions in which there is a dispersed particulate phase and a dispersant continuous phase. It is also meant to include those mixtures in which there are two or more phases and some or all of them are continuous and interpenetrating as well as simple mixtures in which the phases are particulate or interrupted and homogeneously intermixed.

According to the present invention, I have discovered that a homogenous interdispersion of fine particles of vanadium nitride, zirconium nitride, hafnium nitride, niobium nitride or their mixtures in iron, cobalt, nickel, or their alloys, in a manner such that the nitride and the metal are mutually dispersed in relation to one another, provides a refractory interdispersion possessing exceptional properties.

The metals suitable for use in the interdispersions of this invention are iron, cobalt, nickel, and their alloys in any proportion with one another. Also limited amounts of other conventional alloying agents can be used with these metals as is more fully explained hereinafter.

These metals with the requisite degree of purity can be obtained from commercial sources or they can be prepared in a conventional manner. A suitable method of preparation and purification is fully set forth hereinafter.

The nitride to be used in the interdispersions of this invention can be prepared in any conventional manner or by suitable reactions in molten salts. The nitrides of this invention, sometimes referred to hereinafter as essential nitrides, can be used alone, in combination with each other, or in mixtures with other stable refractory compounds. Preparation of the nitrides by reaction in molten salts and suitable refractory additives and the criteria for their selection are described in full hereinafter.

The interdispersions of this invention are prepared by intimatey intermixing the nitride to be used, in the form of very fine particles, with the metal to be used, also in the form of very fine particles, until a homogenous interdispersion is obtained. This homogenous powder can then be heated and pressed into the desired form and to the desired degree of density. Methods of preparing the powder interdispersions and refractory interdispersions are more fully discussed hereinafter.

The preparation of the powder interdispersions is very important because the outstanding properties of the refractory interdispersions formed therefrom depend to a large degree on the composition of the powder. For example, the homogeneity of the interdispersion of metal and nitride, the ultimate particle and crystal size of the nitride and metal, and the proportional amounts of metal and nitride are important in achieving the desired properties in the refractory interdispersions of this invention and are largely determined by the powder which is used to form the refractory interdispersion.

The particle size of the metal and nitride being incorporated into the powder interdispersions of this invention should be as small as is practicable and the preferred maximum particle size is about fifty microns. However, as the desired homogeneity of interdispersion is much easier to attain as the particle size decreases, it is advantageous for the components to have an average particle size of less than ten microns.

If the interdispersed powders are to be used to form very strong refractories like cutting tools and bits, it is preferred that the average particle size of the components be smaller than one micron. Such a particle size adds significantly to the degree of strength, toughness and wear resistance obtainable in the refractory interdispersion of this invention and necessary for the use of such compositions as cutting tools.

Refractory interdispersions of this invention can be formed from powdered interdispersions of the nitride and metal wherein there is from about one to about ninety-nine parts by volume of nitride per part of metal. If the amount of nitride in a powder is below one part by volume per part of metal, the hardness of a refractory interdispersion made therefrom is less than that which is desired. Amounts of nitride in the powders above ninety-nine parts per part of metal tend to lessen significantly the impact strength of refractories made therefrom.

A preferred amount of nitride in the powder interdispersions of this invention is between 3 and 50 parts by volume per part of metal. Restricting the amount of the nitride to less than 50 parts by volume increases the probability of continuity of the metal within the refractory interdispersion to be formed, and in turn, the probability of outstanding impact resistance, strength, and toughness. Conversely, the presence of at least 3 parts of nitride by volume per part of metal in the powder insures a hardness, wear resistance, and chemical resistance in a refractory interdispersion made therefrom which makes it very desirable for such refractory uses as cutting tools and bits.

One of the preferred embodiments of this invention is a powder interdispersion in which the nitride particles are separated from each other by particles of the metal. This retards agglomeration or aggregation of the discrete nitride particles during fabrication of refractory interdispersions of the invention.

Another preferred embodiment of this invention is an interdispersion in which discrete nitride particles are uniformly dispersed in the metal which is present as a continuous matrix separating the discrete nitride particles. Such a distribution of the metal ordinarily provides greatly improved mechanical properties in a refractory interdispersion, making it very desirable for uses such as cutting tools and bits. The term "discrete" as used herein means individually distinct or composed of distinct parts.

Still another preferred embodiment of this invention is a solid interdispersion in which there is a limited degree of interconnection into a continuous matrix, or three-dimensional network, of both of the principal phases of the invention. Such a structure is one in which both the nitride phase and the metal phase are co-continuous with an interpenetrating network of each phase being simultaneously present. Such compositions exhibit most outstanding properties when the individual crystallites of the interpenetrating networks, although connected to one another, are quite small and distinguishable and thus discrete.

However, it must be noted that a distribution of the nitride and metal such as described in the three preceding paragraphs is not essential to this invention since outstanding refractories can be produced in the absence of such a state of distribution.

It is desirable that both the nitride and the metal used possess a high degree of chemical purity. In particular, it is desirable to avoid the presence in either component, of oxygen, nitrogen, boron, silicon, or sulfur either in uncombined form or as compounds having a lower free energy of formation per atom than the corresponding oxides, nitrides, borides, silicides, or sulfides of iron, cobalt, nickel, or their alloys. Other such elements or compounds in a form and in amounts which would react with or dissolve in the metal used during fabrication of the refractory interdispersion in such a manner so as to cause undesirable brittleness of the metal, should likewise be avoided. Examples of such impurities which should be avoided are nickel oxide, iron oxide, cobalt oxide, chromium oxide, and large amounts of free carbon.

Limited amounts of alloying agents conventionally used with the primary metals iron, cobalt, and nickel, can also be used in the interdispersions of this invention and are preferably retained as a homogeneous solution with the primary metal, having the crystal structure of the primary metal. Amounts of such alloying agents as chromium, tungsten, molybdenum, manganese and others, which would form intermetallic compounds or new crystallographic phases are preferably avoided. Allowable percentages of such agents can be determined, according to this criteria, by consulting appropriate phase diagrams in standard metallurgical texts. The solubility of the alloy metals in the primary metals at 600° C., as reflected in such phase diagrams are ordinarily determinative of the preferred allowable amounts of allowing agents. Molybdenum, tungsten, and chromium are the preferred alloying elements as they form solid solutions with iron, cobalt, and nickel, thus improving their mechanical properties.

It should be noted however that even when alloying agents are present in excess of the above amounts, a ductile metal phase is present so long as the excess is not too large. Thus, for example, a dilution of a metal phase such as iron with amounts of tungsten up to 30% in excess of the solubility as determined by the above criteria, is not appreciably deleterious to the properties of a refractory interdispersion of this invention.

Therefore the working limit for the minor amounts of alloying agents which can be present in the primary metals of this invention can be defined as not more than 30 volume percent, based on the total amount of metal, in excess of that amount which (a) is held as a homogeneous solid solution at 600° C. in the primary metal, and (b) has the crystal structure characteristic of the primary metal of this invention. Preferably the amount of alloying agent will not exceed that amount characterized by (a) and (b) above.

When extreme hardness is desired in the metal to be used in the dispersion, elements such as titanium, boron, silicon and carbon can be used in small amounts according to conventional metallurgical practices of heat-treating to precipitation harden such metals. Of these elements, titanium is preferred for nickel based alloys and carbon is preferred for ferrous alloys.

As was previously stated, the nitrides of hafnium, zirconium, niobium or vanadium can be used singly or in combination with one another and other refractory additives in the interdispersions of this invention. When used in combinations, it will often be noted that varying degrees of interaction occur. This may include the formation of solid solutions, the formation of mixed nitride compounds, or combinations of these. It will be understood that the purposes of this invention are accomplished both when such interactions take place, and in those instances where the several nitrides remain in their original discrete forms. In terms of the properties of the resulting interdispersions such as wear resistance, mechanical properties, and refractory characteristics, simple mixtures, solid solutions, and mixed nitride compounds all behave in a desirable fashion, imparting outstanding characteristics to the compositions of the invention.

Other chemically stable refractory compounds can be used as additives to partially replace the above essential nitrides in the dispersions of this invention. Such refractory chemically stable nitrides as uranium nitride, boron nitride, beryllium nitride, cerium nitride, and thorium nitride can be used to replace a portion of the zirconium nitride, hafnium nitride, vanadium nitride, niobium nitride, or their mixtures. Chemically stable, refractory carbides, such as titanium carbide, tungsten carbide, zirconium carbide and niobium carbide can also be used as partial replacements for the nitrides of this invention. In a similar fashion, some of the more chemically stable and refractory borides, such as the monoborides of titanium or zirconium can also be employed.

It is essential, however, that a nitride of zirconium, hafnium, vanadium, niobium, or their mixtures, always be present in significant amounts as one of the non-metal components in the interdispersions of this invention. By significant amounts it is meant that the essential nitrides of the invention must be present in amounts of at least five volume percent of the non-metal phase of the compositions of the invention, and preferably in amounts greater than 5%. It will generally be noted that the compositions of the invention are improved in proportion to the amount of the essential nitrides which are added, at least up to the point at which a continuous phase of nitride is formed in the solid compositions of the invention. The necessary criterion for assuring that this will be true for the most preferred compositions of the invention will be discussed in greater detail hereinafter.

It is also essential, as previously mentioned, that the refractory compounds used as additives not be those which will react with the bonding metals in such a manner so as to embrittle it, or which will break down to elements whose presence cannot be tolerated for the same reason.

In general, the criteria to be followed in selecting additive compounds is that their melting point should exceed 1400° C., while their free energies of formation from the constituent elements be greater than the free energies of the compound which would be formed by disproportionation of the additive compound and reaction of the constituent elements with the bonding metal.

Any standard reference text which discloses the free energies of formation of metal alloys, intermetallic compounds, and refractory carbides, nitrides and borides can be consulted for the necessary information to apply this criterion.

It should be noted, however, that small amounts of additives, even including those which may react by disproportionation are not absolutely precluded from the compositions of the invention. But when such reactions can occur it is necessary to restrict the amount of any such additive to quantities which are small with respect to the amount of the bonding metals of the invention in the particular composition employed. Such restriction prevents the tying up of an amount of bonding metal which would reduce the strength of the refractory interdispersion and make it undesirably brittle.

The amount of refractory additive to be used will preferably be less than an amount sufficient to form an interpenetrating network of the additive and prevent the formation of a network of the essential nitrides.

Formation of a continuous network does not depend solely on the relative volume fractions of the nitride and the additive, since it is also influenced in considerable degree by the particle size or crystallite size of the nitrides relative to the additive particles. Thus, if coarse-grained particles of the additive are employed, as for example 10 micron sized particles, in conjunction with very finely divided particles of the essential nitrides of this invention, for example in the size range of 20 to 100 millimicrons, an interpenetrating network bonded essentially by the essential nitrides will be formed. This is true even though the nitrides are present in amounts as small as 5% of the non-metal phase.

As it is generally preferred to use additives having a particle size of less than a micron, somewhat larger amounts of essential nitrides, on the order of 20% of the non-metal phase, are usually required to achieve desired continuity. Similarly, if the particle size of the essential nitride to be used is larger than 20 millimicrons it can become necessary to use the nitride in amounts as great as 50% or more of the non-metal phase to ensure the preferred nitride bonding of the continuous non-metal phase.

A general criterion to follow for the formation of this preferred type of structure is that the product of the volume fraction and the surface area per unit volume of the essential nitrides be approximately equal to, or preferably in excess of, the product of the volume fraction and surface area per unit volume of the additive to be employed. Proper attention to this criterion in selecting compositions will ordinarily result in the preferred type of structure.

Since the structure is also determined to some extent by the rates of crystal growth which occur during fabrication, however, it is not necessary to apply this criterion in a completely rigid fashion. In particularly favorable circumstances, wherein the rate of growth of the nitride network under the fabrication conditions employed greatly exceeds the rate of growth, or the recrystallization rate of the additive to be employed, amounts of the essential nitrides considerably less than those corresponding to the above criterion can be employed, and the preferred nitride-bonded interpenetrating network of the non-metallic phase still will be formed.

PREPARATION OF THE METALS

As stated previously, the metals which can be used in the interdispersions of this invention are iron, cobalt, nickel, and their alloys. A suitable method of preparation of these metals for incorporation into the interdispersions of this invention is hydrogen reduction of the corresponding metal oxide or carbonate at a temperature of from about 600° C. to about 1200° C.

In the preparation of the metals to be used in this invention, it is best to employ as low a temperature as is consistent with a reasonably rapid completion of reduction. This is done to prevent excessive sintering and agglomeration of the particles of metal being formed.

The reduction will be followed by milling operations in an inert liquid medium. In this manner the metal can be obtained in a powder form, preferably having a specific surface area greater than one square meter per gram, which makes it convenient for its subsequent interdispersion with an essential nitride. It is desirable that the grinding media used in the milling operations be constructed of the same metal as that being prepared so that a foreign material is not introduced by attrition of the grinding media, or that they be constructed of extremely wear-resistant material such as cobalt bonded tungsten carbide to minimize possible contamination.

PREPARATION OF THE NITRIDES

The nitrides to be used in this invention can be prepared by any conventional method or by a suitable reaction in a molten salt such as described below.

Suitable salts for a salt bath to be used in this reaction can be, for example, the alkali and alkaline earth halides, particularly those which are thermally and thermodynamically stable such as the chlorides and fluorides of sodium, potassium, lithium, calcium, magnesium, and barium.

A second component of the molten salt bath will be a halide or oxide of vanadium, zirconium, niobium, or hafnium. This component is the source of the metal for the nitride which is to be prepared.

A stoichiometric amount of an alkali or alkaline earth nitride, such as the nitrides of sodium, lithium, calcium, magnesium and the like, is added in small increments to the molten bath. Incremental addition of the nitride avoids a too vigorous reaction. The reaction mixture is vigorously stirred during the nitride addition to insure a complete reaction.

The temperature of the reaction should be between the melting point of the salt mixture and 1200° C. Generally speaking, a temperature of at least 450° C. is desirable while a range of from 600° C. to 1100° C. is most preferred for these reactions.

The product of the reaction can be recovered from the molten salt bath by quenching it and dissolving the salt and reaction by-products in a solvent which shows a high preferential solubility for the salt and the by-products, but which does not substantially or rapidly attack the refractory nitrides. Suitable solvents are distilled water, alcohols, and water mixed with acids, such as hydrochloric and acetic acid.

If desired, the nitride thus recovered can be additionally purified by reduction in an atmosphere of cracked ammonia.

The nitride can be recovered from the molten salt in some instances by distilling off the salts and by-products at a temperature of from 1100° C. to 1400° C. under high vacuum. This procedure avoids exposing the nitride to oxygen, eliminating the need for further reduction with ammonia.

In the event that some aggregation occurs during the synthesis of the nitride, it is possible to disaggregate the particles such as by ballmilling in a nonreactive solvent.

Following the milling, it may be desirable to purify the nitride as by acid treatment, to remove impurities picked up during the milling through attrition of the grinding media. If it is desired to achieve a very low oxygen level, the nitride can be reduced in an atmosphere such as cracked ammonia to remove any oxygen picked up during the purification procedure.

To avoid the necessity for purification, it is preferred to use a grinding media such as the balls, of the same metal as that with which the nitride is eventually to be interdispersed.

PREPARATION OF THE POWDER INTERDISPERSIONS

The interdispersions of the metals with the nitrides, and other refractory compounds if desired, in the form of a powder, make up one of the preferred forms of this invention. The vanadium nitride, zirconium nitride, hafnium nitride, niobium nitride or their mixtures, and such other refractory compounds as may be desired can be interdispersed with the metal powder in any convenient manner such as by mixing in a hydrocarbon solvent in a colloid mill or a ballmill. Preferably the hydrocarbon solvent will be one of sufficiently high boiling point and flash point to avoid a fire hazard. Ball milling times of from 24 to 500 hours have been found satisfactory.

Since the nitride constituent of the invention is difficult to purify, it is desirable to employ grinding media, such as the balls, of the same metal as that with which the nitride is being interdispersed, or of material which is extremely resistant to attrition, such as cobalt-bonded tungsten carbide. This insures that foreign materials will not be introduced as a result of the attrition of the grinding media. The mill can be one which is coated with an elastomeric material such as neoprene, which is not softened or attacked by the grinding fluid. Milling conditions, such as the volume loading of the mill and the rate of rotation, should be optimized as hereinafter illustrated in the examples.

After milling the mixture to homogeneity, the grinding fluid can be removed by washing with a suitabe solvent such as hexane and drying under vacuum. The milled powders absorb water or oxygen rapidly and must be kept out of contact with air and moisture. The powders of this invention are therefore handled in an inert atmosphere, but if contamination occurs, the powders can be reduced to remove such impurities. This reduction will preferably be performed below 1000° C. with very dry pure hydrogen.

The average size of the particles can readily be determined by examination of the interdispersed powders using a light microscope for larger particles and an electronmicroscope for smaller particles. By average particle size is meant the number average of the particle diameters. In the preferred powder dispersions the surface area per cubic centimeter of solids is from about 3 to 180 square meters. The surface area per cubic centimeter can be determined by multiplying the density of the solids in the dispersion by the specific surface area as measured by standard nitrogen absorption techniques.

PREPARATION OF REFRACTORY INTERDISPERSIONS

The interdispersions of the metals with the nitrides, and such other refractory compounds as may be desired, in the form of a solid, make up another preferred form of this invention. A representative method for forming these interdispersions is by pressing and heating the powder interdispersions to nearly theoretical density. The pressing and heating may be done sequentially as in cold pressing and sintering, or it may be done simultaneously as in hot pressing, hot extrusion, hot forging, hot rolling, or hot coining. Pressing and heating can be conducted in a vacuum or in the presence of an inert atmosphere such as nitrogen, helium, hydrogen, or argon. The preferred method of fabrication is by hot pressing.

The pressing temperature will depend on the amount of metal employed, its state of subdivision, and the composition and state of subdivision of the nitrides. Generally speaking, the tempraetures will be at least 6/10 of the melting point, expressed in degrees Kelvin, of the metal component and should be at least 1000° C. and not more than 2000° C. The larger the amount of nitride being used, and the lower the pressure being employed, the higher should be the fabrication temperature. When hot pressing is employed heat and pressure can be applied simultaneously or sequentially, but it is preferred to delay application of pressure until the goal temperature is reached. It is also preferred to use a temperature of from about 1350° C. to about 2000° C.

The time the compact spends at the highest temperature used and under the full pressure employed will vary according to the temperature and method of fabrication used and the composition and state of interdispersion. Generally, the time will vary from a few seconds in hot extrusion to one to 30 minutes in hot pressing and from 10 minutes to several hours when fabrication is by cold pressing and sintering.

The pressure employed will also vary according to the temperature and method of fabrication used and the composition and state of interdispersion, but will generally range from 500 pounds per square inch to more than 6000 pounds per square inch.

The applicable combinations of pressing conditions will hereinafter be more completely illustrated in the examples.

An alternate method of interdispersing the components with one another, prior to preparation of a solid interdispersion, is to precipitate the metal to be used on previously prepared fine particles of the nitride to be used. The metal can be precipitated, for example, as a hydrous oxide, or hydrous metal carbonate and the resulting homogeneous mixture can then be reduced in an atmosphere rich in both nitrogen and hydrogen, such as cracked ammonia. This allows the reduction of the oxides which are present without effecting a change in the nitrides being used.

After a refractory interdispersion has been prepared, the particle sizes of the components can be determined by making a metallographic section, etching the section with an appropriate chemical, and examining the surface with a microscope, using an optical microscope or an electronmicroscope, as is appropriate. Where an electronmicroscope is to be used, a conventional carbon or plastic replica of the surface is made first and the measurements are then made on the replica.

The average particle size of the components of a refractory interdispersion of this invention should be less than 50 microns. In the more preferred embodiments of this invention the average particle size will be less than 10 microns, and in the most preferred embodiments of the invention the average particle size will be less than one micron.

The nature of the interdispersion of the nitride with the metal and the dimensions of the metal in the refractory interdispersions of this invention will be a function of the fabrication conditions and the volume fraction employed as well as the nature of the starting material. Some clumping or aggregation of nitride particles will occur, but as mentioned previously, one of the preferred embodiments of the invention is that in which most of the nitride particles are separated from each other by some of a continuous metal matrix giving a homogeneous and uniform interdispersion of discrete nitride particles.

Also as stated previously, one of the most preferred embodiments of this invention is a refractory interdispersion in which there is a co-continuous network of very finely divided, discrete crystallites of both the metallic phase and the nitride particles, such crystallites having an average particle size of less than one micron.

More specifically, it is desired that the homogeneity of interdispersion be such that the distribution of the nitride and metal in the refractory interdispersion is on a 1000 square micron scale, and more preferably on a 100 square micron scale. By this is meant that a metallographic or an electron micrographic scan, as conventionally used in metallurgy to examine the structure of alloys, will show both the nitride and metal present within a square region no greater than 32 microns on edge, and preferably no greater than 10 microns on edge. Moreover, in the most preferred embodiment of this invention each square region 10 microns on edge which is examined will exhibit substantially the same structural characteristics as every other such region in the interdispersion within conventional statistical distribution limits.

The presence of a continuous phase of the metal in preferred refractory interdispersions of this invention can be most simply determined by measuring the electrical resistivity of the interdispersion. Since the refractory compounds used in this invention have a higher electrical resistance than do iron, cobalt, nickel, or their alloys, if the refractory compounds are distributed so as to interrupt the continuity of the metal, the electrical resistivity of the refractory interdispersion will be at least 10 to 100-fold higher than if the metal is continuous. Conversely, if an electrical conductor such as iron, cobalt or nickel is distributed as a continuous phase throughout a refractory interdispersion of this invention, the electrical resistivity of the interdispersion will be inversely proportional to the volume fraction and thickness of the continuous pathway of the metallic constituent. Appreciable continuity of the metal throughout a refractory interdispersion of this invention is indicated by a specific electrical resistivity of less than about one ohm centimeter; in the preferred refractory interdispersions the specific electrical resistivity will be less than about 0.05 ohm centimeter; and in the most preferred refractory interdispersions the specific electrical resistivity will be less than 0.1 milliohm centimeter.

It is usually possible by inspection of suitably prepared metallographic specimens of the compositions of the invention to determine and demonstrate which of them contain the preferred interpenetrating nitride network. If the crystallite size is of the order of a micron or larger for the various components in the structure the existence of such a network may be observed directly in an optical microscope, using a magnification of 1000 or 2000-fold. If certain structural units, or all of the structural units, are substantially smaller than a micron, the structure can be examined by electron micrograph replica techniques, using conventional procedures.

The refractory interdispersions of this invention have a density in excess of 90% of the theoretical density and preferably in excess of 95% of the theoretical density. Those refractory interdispersions which are to be put to such uses as cutting tools most preferably have a density in excess of 98% of the theoretical density and are substantially free from pores when examined by metallographic methods. The theoretical density is calculated by assuming that the specific volumes of the individual components are additive.

The density of the refractory interdispersions of this invention can be determined by any technique for determining the simultaneous weight and volume of the composite. Most simply the weight can be determined with a sensitive analytical balance and the volume can be determined by mercury or water displacement.

It should be understood that the previously discussed aspects of the structure, purity, density, homogeneity, and metal continuity of the refractory interdispersions of this invention are each contributing factors toward achieving improved properties in such interdispersions. However, the most outstanding results are obtained when all of the characteristics are simultaneously present. Such refractories, in the form of cutting tools or bits, constitute the most preferred embodiment of this invention.

Such a refractory composite is one in which the nitride particles, and particles of other refractory compounds if used, having an average size of less than a micron, are homogeneously interdispersed as a co-continuous phase with a three-dimensional network of iron, cobalt, nickel, or their alloys so that the uniformity of distribution is on a scale of less than 100 square microns. The average size of the metal crystals in the composite is less than one micron and continuity of the metal is such that the composite has an electrical resistivity of less than 0.1 milliohm centimeter. The amount of the nitride and other refractory compounds, if used, is from 3 to 50 parts by volume per part of netal, and the density of the composite is in excess of 99% of the theoretical density. The most preferred metals for such a composite are cobalt and an alloy of nickel with 15 weight percent molybdenum. Among the preferred mixtures of refractory compounds would be vanadium nitride and zirconium nitride, zirconium nitride and tungsten carbide, ternary mixtures of these three, and mixtures of all of these, or any pair of them, or either of the nitrides alone, with titanium carbide.

The refractory interdispersions of this invention are hard, strong, thermal shock-resistant and corrosion-resistant. They display high electrical and thermal conductivity and demonstrate superior resistance to erosion. These properties make them particularly useful for structural applications, for corrosion- and erosion-resistant chemical process equipment, for high temperature electrodes, for dies, thread guides, bearings and seals.

However, as stated before, the refractory interdispersions of this invention are most particularly useful as tool bits in cutting, grinding, shaping, drilling, and punching very hard metal or alloys at high speeds. This is due to their great impact strength and thermal conductivity and their unusual resistance to thermal shock, wear, cratering and welding.

In order that the invention may be better understood, the following illustrative examples are given, wherein parts and percentages are by weight unless otherwise indicated.

Example 1

This example concerns the preparation of zirconium nitride by a reaction in molten salt, and the preparation of a refractory interdispersion of cobalt with the zirconium nitride.

The apparatus used in carrying out this reaction consists of a cylinder 4 inches in diameter and 11 inches high, fabricated from 1/16 inch sheet "Inconel" (80% nickel, 13% chromium, 7% iron). The cylinder is contained in a 1/4 inch wall "Duraloy" (65% iron, 20% chromium, 15% nickel) vessel provided with a flange to which is bolted a tightly fitting head. Two taper joints are attached to the head. Retort shaped glass bulbs are inserted in the taper joints and the solid powder reactants are dispensed from these bulbs by rotating them in the joints so that the powder spills over into the reactor. A stirrer, made from 1/2 inch "Inconel" tube with flat blades of "Monel" welded to the tube, enters the reactor via an asbestor packed bearing. The temperature in the reactor is recorded by means of a thermocouple inserted inside the hollow stirrer shaft. An electrically heated "Calrod" furnace surrounds the pot, the temperature of the furnace Seven hundred and fifty parts of sodium chloride are placed in the reactor, the air displaced with argon, and the salt melted. Thirty-six parts of sodium metal are added and 233 parts of zirconium dichloride are then added. The resulting solution of zirconium dichloride in sodium chloride is then reacted with 83 parts of sodium nitride which is added in ten increments of 8.3 parts each. The seactor is stirred for an hour and then cooled to room temperature, the resulting salt cake is removed and crushed to a fine powder. The excess sodium formed in the reaction is destroyed by a reaction with ethyl alcohol. Following this, the sodium chloride is dissolved in ice cold distilled water, and the product is then washed until it is free of chloride ion by suspending it in distilled water and centrifuging through a Sharples Super-Centrifuge. This requires five washes, using 10,000 parts of water per wash. After the product is free of chloride ion, it is dried in a vacuum oven to give a very finely divided zirconium nitride colloidal powder.

Approximately 100 parts of a colloidal powder of zirconium nitride having an average crystallite size, as shown by X-ray line broadening, and surface area, in the range of 40 millimicrons, is recovered. Oxygen analysis and chemical analysis indicates that the only impurities are about 0.6% oxygen and traces of iron, chromium and nickel in the parts per million range. The 100 parts recovered represents 95% yield, based on theoretical.

Twenty parts of this product are milled in a rubber-lined steel ballmill, containing 260 parts of a high boiling hydrocarbon solvent, and filled to 40% of its volume with approximately spherical ¼ inch diameter cobalt shot. Milling is accomplished at a speed of 60 revolutions per minute and is continued for 24 hours. During milling, a substantial amount of the cobalt is removed from the cobalt shot grinding media and is dispersed in an intimate fashion with the colloidal zirconium nitride particles. This intimate mixture of zirconium nitride and cobalt powders is recovered from the oil by decantation and further oil is removed by washing six times with hexane. It is then vacuum dried overnight and analyzed. Chemical analysis shows it to consist of about 7 parts by volume zirconium nitride per part by volume of cobalt.

Twenty-one and a half parts of this powder are placed in a cylindrical carbon mold which is in turn inserted into the hot zone of an induction furnace coil and held there by two carbon rams connected to the platens of a hydraulic press. At a temperature of 1000° C. a 4000 pounds per square inch pressure is imposed upon the rams. The temperature is increased to 1650° C. and the sample is held at this temperature for 5 minutes. The mold is cooled to room temperature, and the sample is then cut into several test pieces. The average rupture strength of this composition is 85,120 pounds per square inch, its Rockwell A hardness is 86.9, its impact strength is 9.9 foot pounds/square inch, and its density is 6.87 grams/cubic centimeter. This represents 93.85% of the theoretical density calculated for this composition. A portion of this hot pressed refractory interdispersion is formed into a cutting tool, and it cuts satisfactorily for a period in excess of 3 minutes, at a surface speed of 340 surface feet per minute on 4340 steel, using a depth of cut of ⅟₁₆ inch.

Example 2

Thirty parts of the zirconium nitride colloidal powder prepared as described in Example 1 is milled as described in Example 1 with the exception that nickel shot are employed rather than cobalt shot as a grinding media. After recovering and purifying the nickel-zirconium nitride dispersion as described in Example 1, a chemical analysis shows it to contain about 11.8 parts by volume zirconium nitride per part by volume of nickel.

This powder is pressed in an identical fashion to that described in Example 1, and resulting refractory interdispersion of the invention is tested as previously described. The average rupture strength is 65,100 pounds per square inch, the Rockwell A hardness is 87.8, its impact strength is 13.4 foot pounds per square inch, and its density is 6.90 grams per cubic centimeter. This density corresponds to 95.4% of the theoretical density for this composition. On being tested as a cutting tool on 4340 steel in an identical fashion to that described for Example 1, this material has a flank wear of only 16 mils after 3 minutes of cutting at a surface speed of 340 feet per minute, and depth of cut of ⅟₁₆ inch.

Example 3

Thirty parts of the zirconium nitride prepared as described in Example 1 are interdispersed with 2 parts of 44 micron particle size pure molybdenum powder and 8 parts of 44 micron particle size nickel powder. This dispersion is loaded into a 1.1 liter rubber-lined steel mill along with 2500 parts of ¼ inch long, ⅛ inch diameter cylindrical rods of 94% tungsten carbide and 6% cobalt, and 260 parts of a high boiling hydrocarbon oil. The mill rotated at a speed of 60 revolutions per minute for a period of 24 hours.

Upon recovering the zirconium nitride-nickel-molybdenum powder as described in previous examples and analyzing it, it is found that it has the following composition: 70.75 weight percent zirconium nitride, 4.72 weight percent molybdenum, 18.87 weight percent nickel, and 5.6 weight percent of the tungsten carbide-cobalt mixture used as a grinding medium. Thus, the powder contains 3.5 parts by volume of zirconium nitride and about 0.4 parts by volume of tungsten carbide per part by volume of metal.

Twenty-one and a half parts of this powder is hot-pressed as described in Examples 1 and 2 and the resulting refractory interdispersion of the invention has a rupture strength of 68,800 pounds per square inch, a Rockwell A hardness of 87.5, and an impact strength of 10.5 foot pounds per square inch, with a density of 6.89 grams per cubic centimeter. This represents 90% of the density to be expected for this composition.

In spite of its relatively low density, this composition is quite effective as a cutting tool for 4340 steel, exhibiting a fllank wear of 15 mils after cutting 3 minutes at 340 surface feet per minute, and a depth of cut of ⅟₁₆ inch. Even after cutting at 500 surface feet per minute for three minutes, the flank wear is only 30 mils.

Example 4

A steel ballmill is loaded with 127 parts of the finely divided zirconium nitride powder prepared as described in Example 1, 10.5 parts of a finely divided molybdenum powder, and 8.6 parts of nickel powder. As noted in Example 1, the zirconium nitride has an average crystallite size as shown by X-ray line broadening and by measurement of nitrogen surface area of about 40 millimicrons, and the oxygen analysis indicates that the only impurities are about 0.6% oxygen, and traces of iron, chromium, and nickel in the parts per million range. The nickel powder that is used has a particle size of 1.3 microns as determined by nitrogen surface area, and an X-ray crystallite size as determined by X-ray line broadening of 160 millimicrons. The molybdenum is also very fine, having a surface area of 1.3 m.²/g. and an X-ray crystallite size of 79 millimicrons. Also loaded into the mill is 236 parts of a high boiling hydrocarbon oil having a flash point of 130° C., and 6,000 parts of tungsten carbide-cobalt inserts. This mixture is ballmilled on rubber-lined rollers at 85 r.p.m., for five days. Recovery of the product is effected by transferring the slurry from the ballmill into a resin kettle, allowing the slurry to settle out from the hydrocarbon oil and siphoning off the supernatant liquid. The wet cake is then dried under a vacuum of 0.5 mm. Hg, at about 250° C. When dry, the resin kettle is opened to the inert atmosphere of a nitrogen filled dry box and is screened through a 70 mesh screen (U.S. sieve size). A sample of this 70 mesh material is hot pressed according to the following procedure:

The sample is heated under 45 kilowatt power in an induction furnace to a temperature of 1590° C. in a graphite mold, and is held at 1590° C. for 3 minutes under zero pressure. Then 4000 p.s.i. is applied to the sample and held until the sample has ceased to slump. The sample is then allowed to cool rapidly to room temperature. The hot pressing process is done in a vacuum of 1 mm. Hg. The resulting refractory interdispersion is cut with a diamond saw to give specimens for testing transverse rupture strength and hardness on Rockwell A scale. A section is machined in the form of a metal cutting tool insert, ½″ x ½″ x ³⁄₁₆″. The transverse rupture strength of this specimen averages 252,800 p.s.i. It has a Rockwell A hardness of 92.

Metallographic examination of this interdispersion reveals a lack of porosity, and that the sample is extremely fine grained, having an average particle size by count of less than 1 micron. Further examination of the compact reveals that the zirconium nitride, the nickel and the molybdenum phases are interdispersed within a square region 10 microns on edge, and ten such 100 square micron regions when examined, all exhibit the same structural characteristics. The nominal volume composition of this compact is 87.6% zirconium nitride, 5.0% molybdenum, 4.70% nickel, 1.6% iron (present as a result of contamination from the mill), and 1.1% tungsten carbide (present as contamination from the inserts used for milling). A cutting tool of this composition is tested on grey cast iron of Brinnell hardness 220, using a depth of cut of 1/8", a surface speed of 1000 feet per minute, and a feed rate of 0.010 inch per revolution. This tool exhibits long life and high toughness when used under these conditions.

A cutting tool insert of this material satisfactorily turns 4340 steel, Brinnell hardness 320, at a speed of 590 surface feet per minute, a feed rate of 0.01 inch per revolution, and a depth of cut of .05 inch. At the end of 3 minutes, the cutting tool has an average flank wear of only 8 mils.

Example 5

Using the procedures and materials of Example 4, with the exception that the composition consists of 113 parts of zirconium nitride, 21.6 parts of molybdenum, and 17.3 parts of nickel, along with 5,950 parts of tungsten carbide-cobalt inserts and 263 parts of hydrocarbon oil, a composition is milled for 5 days and the powder recovered. During the milling it is found that 4.5 parts of tungsten carbide has been picked up as a contaminant from the mill. The composition is hot pressed at a temperature of 1625° C., which requires 9 minutes for the induction heated graphite mold to reach temperature, held at temperature for 3 minutes, and then subjected to a pressure of 4000 p.s.i. for a period of 2 minutes. The resulting interdispersion of the invention consists of 76.6% zirconium nitride, 9.8% molybdenum, 9.3% nickel, 1.4% tungsten carbide, and 2.8% iron, all on a volume basis. Approximately 70% by volume of the metal phase consists of a ductile, single phase nickel-molybdenum-iron alloy containing about 30% by volume of additional molybdenum in excess of the solubility limits of molybdenum in nickel at 600° C. This composition has a transverse rupture strength of 291,000 p.s.i. and a Rockwell A hardness of 90.4.

When employed as a cutting tool (fabricated as described in Example 4) on 4340 grade steel at 158 surface feet per minute, using a feed of 30 mils per revolution and a depth of cut of 1/8", it is found that the tool after cutting for 1 minute without failure exhibits an average flank wear of only 2 mils and no detectable crater wear.

Example 6

This example employs the same raw materials as in Examples 4 and 1, and the procedure of milling and recovery of products is also the same. The composition loaded into the mill consists of 134.5 parts of zirconium nitride, 5.25 parts of molybdenum, 4.32 parts of nickel, 5,900 parts of tungsten carbide-cobalt rod inserts, and 261 parts of hydrocarbon oil. After 5 days of milling it is found that 4.7 parts of tungsten carbide is picked up as a contaminant, along with 8.5 parts of iron. The final composition is therefore 88.8% zirconium nitride, 2.6% molybdenum, 2.1% nickel, 1.4% tungsten carbide and 5.1% iron, all on a volume basis. The metal phase of this composition, after hot pressing, consists essentially of a single phase nickel-iron-molybdenum alloy with only a small amount of a second phase of molybdenum in excess of the solubility limit at 600° C.

This composition is heated over a period of 8 minutes to a temperature of 1625° C., held at this temperature for 3 minutes, and is then hot pressed, using a pressure of 4000 p.s.i. for a period of 4 minutes at the same temperature, and is then ejected from the hot zone of the press. Its transverse rupture strength is 248,000 p.s.i., and Rockwell A hardness 90.3. This material is an excellent cutting tool for cast iron, even under very heavy cutting conditions, and it has long tool life and gives an excellent surface finish to the work. When used to turn 4340 grade steel of a Brinnell hardness of 330, it machines for 3 minutes without failure, and has an average flank wear of 12 mils and a crater depth of only 0.5 mil.

Example 7

A mixture of 90 parts of the zirconium nitride of Example 1 and 10 parts of a 10 micron sized powder of hafnium nitride is milled in a rubber-lined mill for 3 days. The tungsten carbide-cobalt rods of Example 3 are used as the grinding media, and this nitride powder is suspended in 260 parts of a high boiling hydrocarbon oil. Following recovery of the mixed nitride powders from the mill and from the oil as described in previous examples, these powders are loaded into alumina boats and sintered at a temperature of 1650° C. for a period of 8 hours, under a nitrogen atmosphere. The resulting somewhat aggregated powder is crushed up and is found to consist of a 10 weight percent hafnium nitride-90 weight percent zirconium nitride solid solution, having particles approximately 50 microns in diameter. Sixty-eight parts of this powder and 4.45 parts of a 1 micron sized carbonyl nickel powder are ballmilled, using a 1.1 liter rubber-lined steel ballmill, filled to 40% of its volume with 3/8 inch diameter nickel shot and containing 260 parts of a high boiling hydrocarbon oil. The powder is recovered after 2 days of milling at 60 revolutions per minute in a manner similar to that described in previous examples. Twenty-eight parts of this dispersion are hot pressed at a temperature of 1600° C. under a pressure of 500 pounds per square inch with a holding time at maximum temperature in the press of 30 minutes. The resulting refractory interdispersion of the invention consists of 5 volume percent nickel metal, and 95 volume percent of a solid solution containing 90 weight percent zirconium nitride and 10 weight percent hafnium nitride. It has a density of 7.24 grams per cubic centimeter, which is approximately theoretical for this composition, a Rockwell A hardness of 88, an impact strength of 10 foot pounds per square inch, and a transverse rupture strength of 72,000 pounds per square inch.

Example 8

Twenty-five parts of finely divided niobium nitride powder are milled in a rubber-lined steel ballmill, containing 260 parts of a high boiling hydrocarbon solvent, and filled to 40% of its volume with approximately spherical 1/4 inch diameter cobalt shot. Milling is accomplished at a speed of 60 r.p.m. and is continued for 24 hours. During milling, a substantial amount of cobalt is removed by attrition from the cobalt shot and is dispersed in an intimate fashion with the niobium nitride particles. This intimate mixture of niobium nitride and cobalt powders is recovered from the oil by decantation and further oil is removed by washing six times with hexane. It is then vacuum dried overnight. The resulting powder consists of about 7 parts by volume of niobium nitride per part by volume of cobalt.

Twenty-three parts of this powder is hot pressed into a refractory interdispersion in a fashion similar to that described in Example 1. At a temperature of 1000° C., a pressure of 4000 pounds per square inch is imposed on the sample. The temperature is increased to 1650° C. and the sample is held at this temperature for five minutes. The mold is cooled to room temperature and the sample removed.

The sample is found to have good transverse rupture strength and high hardness. When a portion of this hot pressed refractory interdispersion is formed into a cutting tool, it is found to perform satisfactorily in cutting steel on a high speed lathe.

Example 9

Twenty-three parts of finely divided vanadium nitride powder are ballmilled using cobalt shot, as in Example 8. The resulting intimate mixture of vanadium nitride and cobalt metal from the attrition of the cobalt shot is separated from the oil and dried as in Example 8. The resulting powder is found to contain about 8 parts by volume of vanadium nitride per part by volume of cobalt.

Twenty parts of this powder are hot pressed into a refractory dispersion in a fashion identical to that described in Example 8.

This refractory interdispersion is found to have high hardness and good transverse bending strength. It is also found to be useful in cutting steel on a high speed lathe.

I claim:
1. A dense, homogeneous interdispersion consisting essentially of from 3 to 50 parts by volume of a nitride selected from the group consisting of vanadium nitride, zirconium nitride and their mixtures and one part by volume of a metal binder selected from the group consisting of iron, cobalt, nickel and their alloys, said interdispersion having a density in excess of 98% of its theoretical density, the metal and nitride having an average particle size of less than 10 microns, and being present in the form of continuous three-dimensional interpenetrating networks.
2. An interdispersion of claim 1 in which the metal is selected from the group consisting of iron, cobalt, nickel, their alloys with each other, and their alloys with minor amounts of an alloy metal selected from the group consisting of molybdenum, tungsten and chromium.
3. An interdispersion of claim 1 in which the metal is selected from the group consisting of cobalt and an alloy of 85% by weight nickel and 15% by weight molybdenum.
4. An interdispersion of claim 1 in which up to 50% by volume of the nitride is replaced by a particulate compound selected from the group consisting of tungsten carbide, titanium carbide and their mixtures.
5. An interdispersion of claim 4 in which the metal and nitride each have an average particle size of less than 1 micron.
6. An interdispersion of claim 5 in which the density is in excess of 99% of the theoretical density.

References Cited

UNITED STATES PATENTS

| | | | |
|---|---|---|---|
| 1,895,959 | 1/1933 | Agte | 29—182.5 |
| 1,996,220 | 4/1935 | Tigerschiold | 29—182.5 |
| 2,123,046 | 7/1938 | Hinnuber | 29—182.5 |
| 2,180,956 | 11/1939 | Hensel | 29—182.5 |
| 2,180,984 | 11/1939 | Hensel | 29—182.5 |
| 3,161,949 | 12/1964 | Dickinson et al. | 29—182.5 |

FOREIGN PATENTS 398,661   9/1933   Great Britain.

BENJAMIN R. PADGETT, *Primary Examiner.*

R. L. GRUDZIECKI, *Assistant Examiner.*